United States Patent [19]

Bozanic et al.

[11] 3,821,636

[45] June 28, 1974

[54] GENERATION OF REPETITIVE SPIN ECHOES IN RUTILE

[75] Inventors: Donald A. Bozanic; Dickron Mergerian, both of Baltimore; Ronald W. Minarik, Lutherville, all of Md.

[73] Assignee: Westinghouse Electric Corporation, Pittsburgh, Pa.

[22] Filed: Mar. 20, 1972

[21] Appl. No.: 236,224

Related U.S. Application Data

[63] Continuation of Ser. No. 45,101, June 9, 1970, abandoned.

[52] U.S. Cl. .......................... 324/0.5 R, 340/173 NI
[51] Int. Cl. .......................................... G01n 27/78
[58] Field of Search ..... 324/0.5 R, 0.5 AC, 0.5 AH; 333/24 G; 340/173 NI

[56] References Cited
OTHER PUBLICATIONS

D. Bozanic et al., – Electron Spin Echo Measurements of Ei Centers in Crystaline Quartz–Phys. Rev. Ltrs.–21(9)–Aug. 19, 1968, pp. 541, 542.

H. Gerritsen et al., –Cromium Doped Titania as a Maser Material–Jour. of Appl. Physics–31(9)–Sept. 1960–pp. 1566–1571.

A. Bloom–Nuclear Induction in Inhomogeneous Fields–Phys. Rev.–98(9)–May 15, 1955–pp. 1105–1111.

*Primary Examiner*—Michael J. Lynch
*Attorney, Agent, or Firm*—F. H. Henson; J. B. Hinson

[57] ABSTRACT

A system for the generation of a plurality of equally spaced repetitive spin-echo signals from an RF "input" pulse and an RF "recall" pulse utilizing a sample of titanium dioxide (rutile) preferably having an irregular shape and being doped with iron group transition group ions to produce paramagnetic defect centers in the order of $1 \times 10^{16}$ defect centers/cm$^3$.

3 Claims, 6 Drawing Figures

PATENTED JUN 28 1974 3,821,636

GENERATION OF REPETITIVE SPIN ECHOES IN RUTILE

This is a continuation, of application Ser. No. 45,101 filed June 9, 1970, now abandoned.

BACKGROUND OF THE INVENTION

1. Field of the Invention

The subject invention is directed to "spin echo" systems utilizing a paramagnetic sample located in microwave transmission line means between a homogeneous DC magnetic field wherein the application of a first and second RF pulse to the sample gives rise to a "spin echo" signal which appears at a time following the second RF pulse corresponding to the time interval between the two RF pulses applied. More particularly, the subject invention is directed to a spin echo system utilizing a sample comprised of titanium dioxide having a predetermined doping concentration of iron group transition metal ions.

The spin echo phenomenon exists when the first RF pulse having a frequency equal to the characteristic or Larmor frequency of the sample is applied at right angles to the DC magnetic field whereupon a torque is applied to the magnetic moment which causes it to be tipped away from the direction of the field. The angle of tipping, that is the angle between the moment and the direction of the field is proportional to the magnitude of the field and the time during which the RF pulse exists. Upon release of the displacing force, the spinning electrons urged again towards realignment by the force of the field rotate or precess about the field in much the same manner as a tipped gyroscope. When the sample is again subjected to another RF pulse also directed normal or transverse to the magnetic field, the sample spontaneously develops a magnetic field of its own which is also normal to the magnetic field and which rotates about the latter's direction. The strength of the rotating field builds up to a maximum and then decays which is then picked up and detected as an electrical pulse called a "spin echo" signal.

2. Description of the Prior Art.

The phenomenon of free nuclear induction is taught in U.S. Pat. No. 2,561,489 issued to F. Bloch, et al. as well as in various well known scientific publications by Bloch and Purcell. The extension of the effect to produce spin echoes was described by E. L. Hahn in an article entitled "Spin Echoes" published in the *Physical Review*, Nov. 15, 1950, at pages 580–594, inclusive. Utilization of the spin echo phenomenon developed in several areas, e.g., as a means of storing computational or informational data as well as detecting different materials in a well logging operation. One example of the former application is disclosed in U.S. Pat. No. 2,799,844 issued to A. G. Anderson, et al. while an example of the second application is shown in U.S. Pat. No. 3,242,422 issued to N. Bloembergen. Both of these patents, while differing in application, have one thing in common, that is the application of one or more successive recall pulses after the application of an input pulse for the generation of a respective number of echoes. In each case, however, an externally applied recall pulse is necessary for the generation of each echo.

SUMMARY

The present invention has for its main object the generation of a plurality of repetitive echoes without the requirement of successive externally applied recall pulses. Briefly, the subject invention is comprised of a substantially heavily doped spin echo sample of titanium dioxide commonly referred to as rutile having a concentration of paramagnetic defect centers in the order of $1 \times 10^{16}$ iron group transition ions/cm$^3$, being preferably configured in an irregular shape which has a plurality of differently oriented facets and located in microwave transmission line means including a microwave cavity operated at cryogenic temperatures. A homogeneous DC magnetic field is applied therethrough. Means are included for coupling a first or "input" and a second or "recall" microwave pulse into the cavity whereupon a plurality of equally spaced spin echo signals are produced. The first spin echo signal and every other echo signal appearing thereafter is phase coherent with the input pulse while the spin echo pulse succeeding the first spin echo signal and the respective every other echo signal thereafter is phase coherent with the recall pulse. Moreover, each echo signal becomes the recall pulse for the immediately following echo signal as well as acting as the recall pulse for a limited plurality (two or three) OF the following echo signals.

DESCRIPTION OF THE PREFERRED EMBODIMENTS

Figure 1:
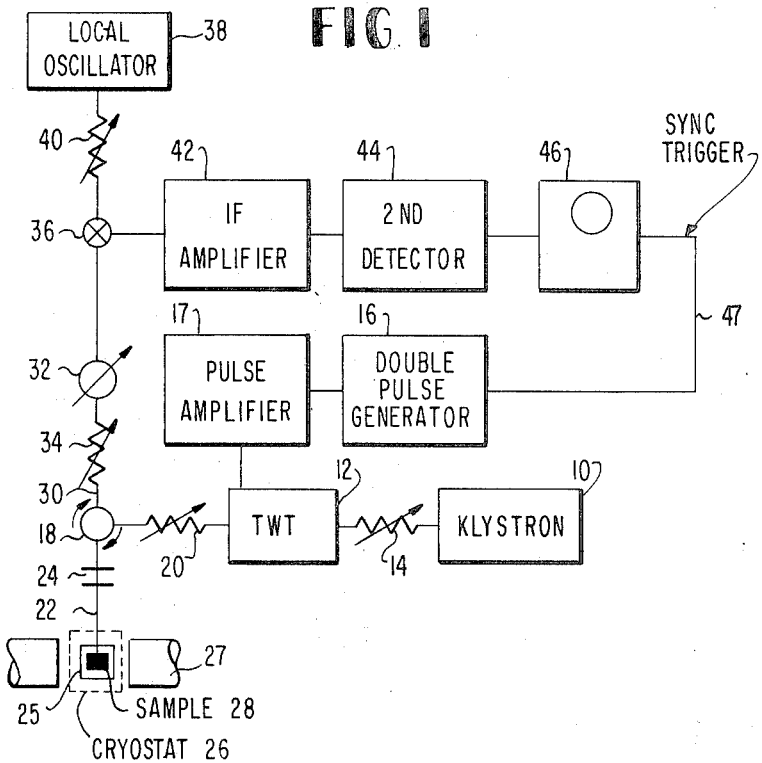
FIG. 1 is a block diagram of a first embodiment of apparatus for practicing the subject invention.

Referring now to the drawings wherein like numerals refer to like parts, attention is directed to FIG. 1 which discloses one embodiment of the subject invention. Reference numeral 10 refers to a microwave source comprising an X-band CW klystron. The microwave source 10 is coupled to a pulsed traveling wave tube 12 by means of a microwave signal path such as a waveguide including the level set attenuator 14. The TWT 12 is controlled by a double pulse generator 16 which is operable to produce a pair of gate signals separated by a predetermined time interval T which are then amplified in the pulse amplifier 17 and applied to the TWT 12 wherein an output is proivded comprising a pair of microwave pulses corresponding to the input microwave pulse P$_i$ and the recall pulse P$_r$ necessary for a spin echo system. This is illustrated in FIG. 5. The pulses P$_i$ and P$_r$ are coupled to a circulator 18 by means of a waveguide path including a second level set attenuator 20 whereupon the microwave pulses P$_i$ and P$_r$ are transferred to a waveguide transmission line 22 including a slide screw tuner 24. The waveguide transmission line 22 is terminated in a microwave cavity 25 which is surrounded by a cryostat 26 which contains a cryogenic material such as liquid helium for operation at extremely low temperatures e.g. 4°Kelvin. The microwave cavity 25 contains a spin echo sample 28 which may be configured in any one of a variety of shapes such as shown with respect to FIGS. 2, 3 and 4. The sample 28 comprises titanium dioxide, referred to hereinafter as rutile, doped with iron group transition metal ions including such elements as iron, manganese, cobalt, chromium, and vanadium and the like. The doping concentration is in the order of $1 \times 10^{16}$ defect centers per $cm^3$. Additionally, a fixed magnetic field such as that supplied by a permanent magnet 27 is located around the cryostat 26 so that a substantially homogeneous magnetic field is applied through the sample 28 located in the microwave cavity 25.

When the two RF pulses $P_i$ and $P_r$ separated by a time period T as shown in FIG. 5 are coupled to the rutile sample 28 having a doping concentration in the order of $1 \times 10^{16}$ defect centers per $cm^3$, a plurality of spin-echo signals $e_1, e_2 \ldots e_n$ equally spaced in time by a period T are generated by the sample which are then coupled back along the waveguide 22 to the circulator 18 and to an output branch waveguide 30 and including a wave meter 32 and an attenuator 34. The spin-echo signals $e_1 \ldots e_n$ are applied to a balanced mixer 36 which receives a local oscillator signal from the oscillator 38 by means of the waveguide path including a variable attentuator 40. The output of the mexer 36 comprises an IF signal resulting from the mixing of the output from the local oscillator 38 and the two microwave pulses $P_i$ and $P_r$ used to generate the repetitive spin echoes in addition to the echo signals $e_1 \ldots e_n$. This IF signal is coupled to an IF amplifier 42 where it is then fed to a second detector 44 which produces a video signal output of the pulses in question which can be viewed on an indicator 46 which may be, for example, an oscilloscope. A circuit lead 47 from the double pulser generator 16 is coupled to the indicator 46 for providing a "sync trigger" signal for viewing any or all of the signals.

Figure 2:
FIG. 2 is a perspective view of one configuration of a rutile spin echo sample.

Referring now to the various configurations of the rutile sample 28, FIG. 2 discloses a cylindrical sample from which two spin echo signals $e_1$ and $e_2$ were experimentally obtained for operation of the embodiment shown in FIG. 1 with the second spin echo signal $e_2$ being approximately 20db down from the first echo signal $e_1$. These echo signals were obtained for input pulse widths of 100 nanoseconds for the first and second RF pulses $P_i$ and $P_r$ and wherein the peak power of these pulses were in the order of 1 milliwatt.

Figure 4:
FIG. 4 is a third configuration of a rutile spin echo sample.
Figure 5:
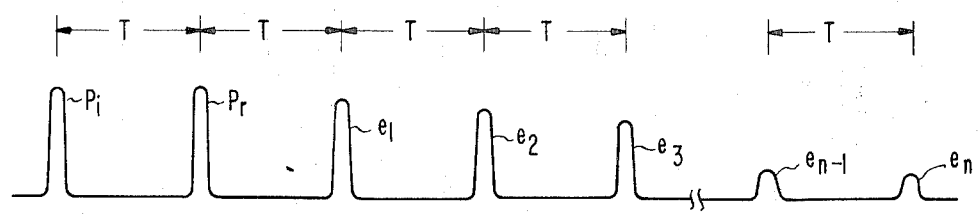
FIG. 5 is a graphical illustration of the time-relation between the supplied and echo pulses.

Utilizing a crescent shaped rutile sample such as shown in FIG. 4, many additional spin echo signals were obtained under the same conditions as stated above wherein succeeding echoes are approximately 3db down from the preceding echo signal. The process that is involved in the generation of repetitive echoes from the single externally applied recall pulse $P_r$ is that every echo signal $e_1$, etc. acts as a recall pulse for the succeeding echo pulse, $e_2$, etc. as well as a number of following echoes $e_3$, $e_4$, etc. Additionally every other echo signal $e_1, e_3, e_5$, etc. is phase coherent with the first input pulse $P_i$. In the same manner, the alternate echo signals $e_2, e_4$, etc. are phase coherent with the recall pulse $P_r$.

Figure 3:
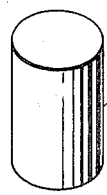
FIG. 3 is a second configuration of a rutile spin echo sample.
Figure 6:
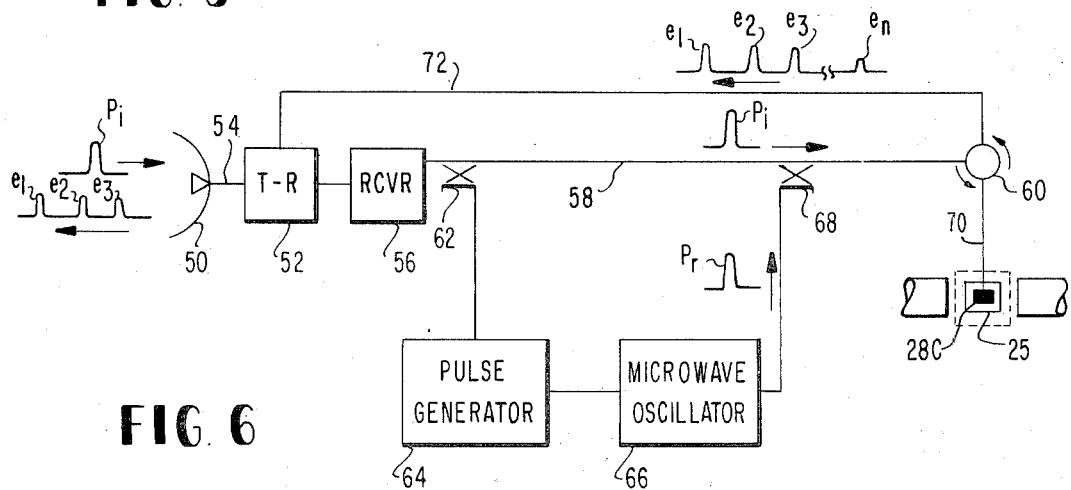
FIG. 6 is a block diagram of a second embodiment of the invention.

Since the utilization of an irregular shaped sample such as shown by the rutile sample 28b as shown in FIG. 3 produces relatively more echo signals than the cylindrical sample 28a shown in FIG. 2, a completely random configuration such as shown in FIG. 4 increases the efficiency of echo production even more. The sample 28c shown in FIG. 4 is a completely random shaped sample having a multitude of facets wherein many modes, i.e. many different integral half wave lengths, can exist within the sample. A sample such as shown in FIG. 4 is desirable for many applications such as radar decoys and electronic countermeasure systems. Such apparatus for example is shown in FIG. 6 wherein there is disclosed antenna means 50 in the form of a microwave "dish" antenna adapted to receive an input microwave RF pulse $P_i$ from an external source, not shown. The input microwave energy is coupled to a transmit-receive (TR) device 52 by means of waveguide 54. The output of the TR device 52 is coupled into a microwave receiver 56, the output of which is coupled by means of waveguide 58 to a circulator 60. A waveguide coupler 62 couples a portion of the signal $P_i$ from the waveguide 58 to pulse generator 64 which includes a variable time delay so that a trigger signal after a time T is coupled to a pulsed microwave oscillator 66 which produces a second or recall pulse $P_r$. The recall pulse $P_r$ is then coupled back to the waveguide 58 by means of a second microwave coupler 68. The input to the circulator 60 then comprises a pair of microwave pulses $P_i$ and $P_r$ which are then coupled into the waveguide transmission line 70, which is terminated in the microwave cavity 25 containing a rutile sample 28c such as shown in FIG. 4. A plurality of repetitive echoes $e_1, e_2 \ldots e_n$ are produced which are coupled back to the waveguide 70. These signals are then translated to the circulator 60 where they are fed into the waveguide 72 which is coupled back to the TR device 52 so that these echo signals are reradiated from the antenna 50.

In many applications where phase coherence is not required, more echoes can be generated which do not possess phase coherence but are nevertheless RF replicas of the first input pulse. This is accomplished by causing a third externally applied RF, not shown, pulse to be instant upon the rutile sample. This is easily accomplished by suitably modifying the apparatus shown in either FIGS. 1 or 6.

Additionally, repetitive echoes can also be obtained for manganese-doped rutile, operating in the temperature range of 77°C, although it has been observed that said last mentioned operation is not as efficient as operation at cryogenic temperatures.

Thus, the present invention eliminates much of the heretofore peripheral equipment required when it is desirable to call the same microwave pulse at more than one later time.

We claim as our invention:

1. A spin echo system comprising:
  a. means for generating at least two pulses of RF energy;
  b. a source of a magnetic field;
  c. a selectively doped spin echo sample shaped such that each spin echo return signal will act as a recall pulse for subsequent spin echo signals when said spin echo sample is selectively subjected to a magnetic field and to pulses of RF energy;
  d. means for selectively subjecting said spin echo sample to said magnetic field and to said pulses of RF energy thereby producing multiple spin echo return signals.

2. A spin echo system comprising in combination:
  means for supplying the RF microwave pulses at least the first two of which are separated by a predetermined time interval;

a resonant microwave cavity;
means for supplying a homogeneous magnetic field of fixed magnitude and direction in said cavity;
microwave transmission line means coupled between said first means and said cavity;
a spin echo sample, said sample having a plurality of facets and being located in said resonant microwave cavity so as to be under the influence of said homogeneous magnetic field and comprising rutile doped with iron group transition metal iron and having a doping concentration in the order of $1 \times 10^{16}$ defect centers/cm$^3$, said spin echo sample being responsive to said first and second RF microwave pulses to generate a plurality of substantially equally spaced spin echo signals upon the reception of said first and second RF microwave pulses.

3. A spin echo system comprising in combination:
means for supplying RF microwave pulses at least the first two of which are separated by a predetermined time interval;
a resonant microwave cavity;
means for supplying a homogeneous magnetic field of fixed magnitude and direction in said cavity;
microwave transmission line means coupled between said first means and said cavity;
a spin echo sample having a crescent shaped cross section, said sample being located in said resonant microwave cavity so as to be under the influence of said homogeneous magnetic field and comprising rutile doped with iron group transition metal iron and having a doping concentration in the order of $1 \times 10^{16}$ defect centers/cm$^3$, said spin echo sample being responsive to said first and second RF microwave pulses to generate a plurality of substantially equally spaced spin echo signals upon the reception of said first and second RF microwave pulses.

* * * * *